United States Patent
Lee

(10) Patent No.: US 8,952,592 B2
(45) Date of Patent: Feb. 10, 2015

(54) MOTOR ASSEMBLY FOR HOUSING A CAPACITOR IN A MINIATURE BRUSHED DC MOTOR AND METHOD OF MAKING THE SAME

(75) Inventor: Keung Lee, Hong Kong (CN)

(73) Assignee: New Bright Industrial Co., Ltd., Hong Kong (CN)

( * ) Notice: Subject to any disclaimer, the term of this patent is extended or adjusted under 35 U.S.C. 154(b) by 0 days.

(21) Appl. No.: 13/367,585

(22) Filed: Feb. 7, 2012

(65) Prior Publication Data

US 2013/0200736 A1    Aug. 8, 2013

(51) Int. Cl.
*H01R 39/38* (2006.01)
*H02K 11/00* (2006.01)

(52) U.S. Cl.
USPC ........... 310/239; 310/68 R; 310/242; 310/244

(58) Field of Classification Search
CPC .............................. H02K 11/00; H01R 39/242
USPC ......... 310/239, 242, 244, 68 R; 439/622, 632
See application file for complete search history.

(56) References Cited

U.S. PATENT DOCUMENTS

| | | | |
|---|---|---|---|
| 4,254,353 A * | 3/1981 | Matsuda | 310/239 |
| 5,010,264 A | 4/1991 | Yamada et al. | |
| 5,294,852 A | 3/1994 | Straker | |
| 5,363,005 A * | 11/1994 | Shibata et al. | 310/244 |
| 6,528,922 B2 | 3/2003 | Lee | |
| 6,717,322 B2 | 4/2004 | Lee | |
| 6,768,243 B1 * | 7/2004 | Yamazaki et al. | 310/239 |
| 7,088,028 B2 | 8/2006 | Lee | |
| 2005/0239331 A1 * | 10/2005 | Bourdykina et al. | 439/622 |

FOREIGN PATENT DOCUMENTS

GB      2389242 A   * 12/2003

* cited by examiner

*Primary Examiner* — Tran Nguyen
*Assistant Examiner* — Jose Gonzalez Quinones
(74) *Attorney, Agent, or Firm* — Nixon & Vanderhye P.C.

(57) ABSTRACT

A motor assembly for a direct current (DC) electric motor, including: a motor cover, a brush base, brush arms and a chip capacitor housed within a protective hollow space provided in the brush base. The brush arms are shaped to support or hold the capacitor within the hollow space and maintain a solderless electrical connection between the terminal ends of the capacitor and the brush arms. The capacitor filters electromagnetic noises in the motor input circuit.

5 Claims, 9 Drawing Sheets

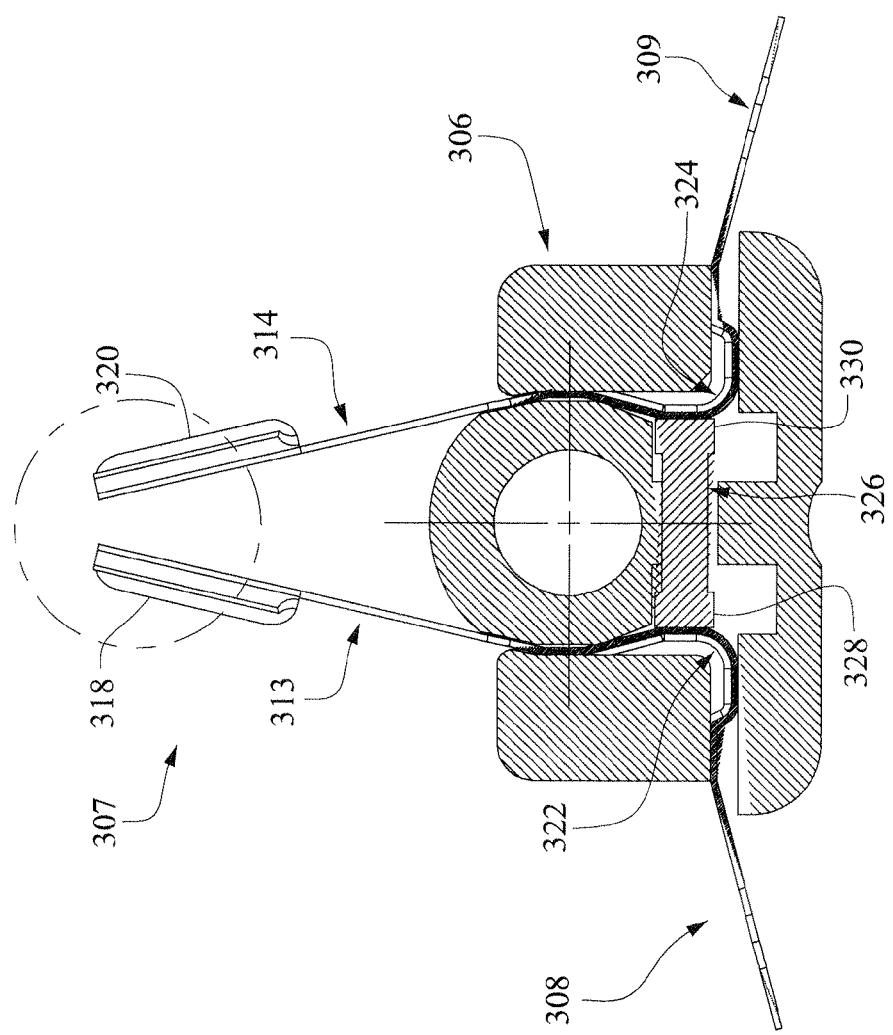
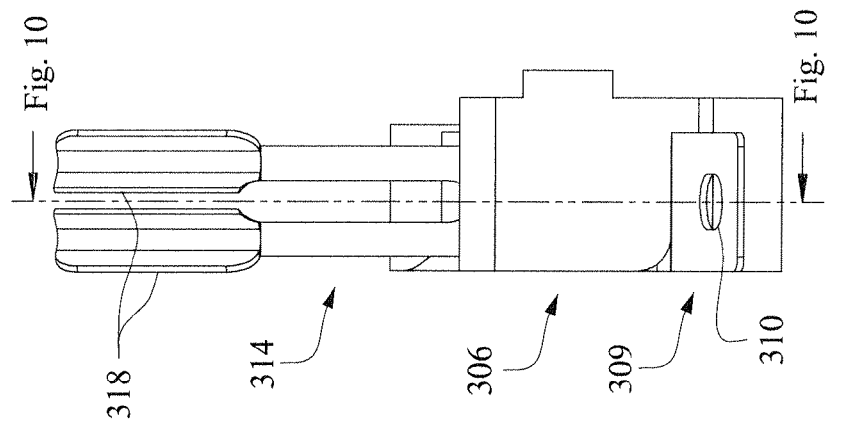
Fig. 10
Fig. 9

MOTOR ASSEMBLY FOR HOUSING A CAPACITOR IN A MINIATURE BRUSHED DC MOTOR AND METHOD OF MAKING THE SAME

TECHNICAL FIELD

Certain exemplary embodiments described herein relate generally to miniature, direct current (DC) electric motors used in motorized devices including, for example, motorized toys, audio and video equipment, hand tools and other electrical motor-driven devices, vehicles or appliances. More particularly, certain exemplary embodiments relate to an improved design and assembly method for using a chip capacitor in the input circuit of a miniature, DC electric motor to filter electromagnetic noises.

BACKGROUND AND SUMMARY

Typical miniature DC electric motors have a metallic cylindrical motor housing formed of mild steel or the like and defining a hollow tubular section and an integral bottom. One end of the motor housing is open to receive a motor cover, which encloses the open end of the motor housing. The motor cover includes a brush arm holder that may comprise a separate brush base, or the brush base may be an integral part of the motor cover. Within the motor housing are fixed a pair of opposite permanent magnets, each of which has an arc shape to match the inner wall of the housing. The magnets form between them a volume in the housing for a rotor. The rotor typically includes a cylindrical armature coaxially mounted on a rotor shaft. The rotor shaft extends through the opposite ends of the motor housing. Bearings may be used to rotatably support the rotor shaft in the ends of the housing. For example, the bottom of the motor housing may have an integral flange, into which a bearing can be press-fitted to support one end of the rotor shaft. The end cap may have a similar bearing structure. In this way, the rotor shaft is held in coaxial alignment with the motor housing.

The brush holder supports a pair of brush arms which provide an electrical connection to an external electrical contact of the motor. The brush arms are generally strips of copper having a first end which serves as the external electrical contact and an opposite, free end on which is mounted a brush. The brush arms are fixed to the periphery of the brush holder and are attached to opposite sides of the brush holder. The brushes located on the brush arms face each other at the axis of the motor. When inserted in the housing, the brushes are in slidable contact with a commutator on the rotor shaft. The commutator provides an electrical contact between the wiring of the armature and the brushes. The armature may include any suitable number of wire windings, such as three windings. The external contacts of the brush arms provide DC current through the brush arms to the brushes. The brushes provide DC current to the commutator. The commutator provides DC current to the windings in the armature. Electrical current input through the armature creates an alternating magnetic field within the housing that interacts with the magnetic field of the permanent magnets. This interaction of magnetic fields creates a force that rotates the rotor. This rotation drives the rotor shaft to provide a mechanical rotational output power source from the rotor. The rotor shaft extends through the bottom of the housing to provide a mechanical power output to drive a gear box or other device. Exemplary miniature electric motors and particular components thereof are shown in, for example, U.S. Pat. Nos. 6,528, 922; 6,717,322; 5,294,852; 5,010,264, the disclosures of which are incorporated by reference herein.

Such miniature electric motors can be and are used in a variety of applications, including, but not limited to, motorized toys, audio and video equipment, hand tools and other electrical motor-driven devices, vehicles or appliances. Miniature DC electric motors tend to be a relatively-low cost component of toys and other equipment. Accordingly, it will be appreciated that it is desirable to reduce the manufacturing costs and complexity associated with making such motors. It is also desirable for various applications incorporating miniature electric motors in a variety of exemplary scenarios to reduce unwanted electromagnetic noises in the electrical input supplied to the motors, as one skilled in the art will appreciate from the description herein.

Shown in FIG. 1 is an example of a conventional DC electric motor brush base and brush arms assembly 100 for attachment to motor cover 128 at brush base attachment section 126 thereof. Assembly 100 includes a first elongated metal strip forming brush arm 106, having a brush 114 on one end and external electrical contact 118 (including soldering hole 110) on the other end, and a second elongated metal strip forming brush arm 108, having brush 116 on one end and external electrical contact 120 (including soldering hole 112) on the other end. Brush arms 106 and 108 may comprise of any electrically conductive metal, but are typically fashioned from copper.

In a conventional assembly method, brush arms 106 and 108 are inserted into opposite ends of brush base 104 at brush arm elbow sections 122 and 124 to form brush base and brush arms assembly 100. FIG. 2 is a sectional view of assembly 100 which shows brush arms 106 and 108 inserted into opposite ends of brush base 104 at brush arm elbow sections 122 and 124. FIG. 3 is a side view of assembly 100 showing longitudinal line bifurcating the assembly along the length of brush arm 106. FIG. 4 shows a cross section of assembly 100. As shown in FIG. 1, assembly 100 is inserted into motor cover 128 at brush base attachment section 126, thereby fixing brush arms 106 and 108 to the inside area of motor cover 128.

FIG. 1 also shows a conventional through-hole type capacitor 102 having two electrically conductive metal wire legs 102a and 102b extending downward and outwardly from the body of the capacitor. In a conventional motor assembly using a capacitor in the electric input circuit for filtering electromagnetic noises, wire legs 102a and 102b of capacitor 102 are electrically connected to brush arms 106 and 108 at external electrical connections 118 and 120 by threading wire legs 102a and 102b through holes 110 and 112, respectively, and soldering the wire legs to the external electrical contacts at holes 110 and 112 and then cutting off any residual metal wire to ensure fitment. FIG. 5 shows a conventional DC electric motor 130 including motor cover 128 attached to motor housing 132 and rotor shaft 129 extending through opposite ends of motor 130. FIG. 5 also shows capacitor 102 soldered to external electrical contacts 118 and 120 at solder holes 110 and 112 in accordance with the conventional assembly method. As shown in FIG. 5, under the conventional assembly method capacitor 102 is located outside the motor cover and motor housing.

This conventional design and assembly method entails a number of problems including, for example: (i) difficulty inserting the wire legs of the capacitor through small holes in the external electrical contacts of the brush arms before the capacitor can be soldered into place; (ii) difficulty soldering the wire legs to the external electrical contacts of the brush arms; and/or (iii) difficulty controlling the consistency of the quality of the soldered connection. Also, the conventional design and assembly method locates the capacitor outside of the protective motor cover and motor housing, where the capacitor is more susceptible to physical damage during assembly, installation and/or use.

FIG. 6 shows a prior art motor cover 200 for use in a miniature, DC electric motor by Johnson Electric. The Johnson design shown in FIG. 6 uses a chip capacitor 202 and choke coil 204 located in the motor cover to form an "L-C" circuit to suppress the electrical noise generated from the commutation between the two brushes and the commutator. As shown in FIG. 6, the chip capacitor in Johnson's design is located on one side of the motor cover opposite to the side where brush arms 206 and 208 are located.

Thus, it will be appreciated that there is a need in the art for a motor assembly design, and/or method of making the same, that overcomes some or all of these and/or other problems and/or that effectively provides for DC electric motor input noise filtering using a simplified and cost efficient manufacturing approach.

One aspect of certain exemplary embodiments relates to a simplified electric motor design, and/or a method of making the same.

Another aspect of certain exemplary embodiments relates to a capacitor in an electric motor input circuit for filtering electromagnetic noises.

Still another aspect of certain exemplary embodiments relates to a capacitor supported or held between two brushes of a motor assembly and in a solderless electrical connection therewith.

In certain exemplary embodiments, a motor assembly for an electric motor includes an electric motor having a motor cover, a brush base for holding two brush arms, and a chip capacitor having two terminal ends with the first terminal end in solderless surface contact with the first brush arm and the second terminal end in surface contact with the second brush arm.

In certain exemplary embodiments, a motor assembly for an electric motor includes a brush holder, a chip capacitor, and two brush arms, with at least one of said brush arms shaped to support or hold the capacitor between the two brush arms and in surface contact therewith.

In certain exemplary embodiments, a method for assembling a DC electric motor including inserting two brush arms into a brush base at opposite sides of a hollow space provided in the brush base and inserting a ceramic chip capacitor in the hollow space between the two brush arms such that one terminal end of the capacitor is in surface contact with one of the brush arms and the other terminal end of the capacitor is in surface contact with the other brush arm.

These features, aspects, and advantages may be combined in any suitable combination to realize yet further exemplary embodiments.

BRIEF DESCRIPTION OF THE DRAWINGS

Certain features, aspects and advantages of the embodiments described herein will be better understood from the following detailed description, including the appended drawings, in which:

FIG. 9 is a side view of a brush base and brush arm assembly of FIG. 8;

FIG. 10 is a cross-section view of the brush base and brush arm assembly of FIG. 9;

DETAILED DESCRIPTION OF CERTAIN EXEMPLARY EMBODIMENTS

Figure 1:
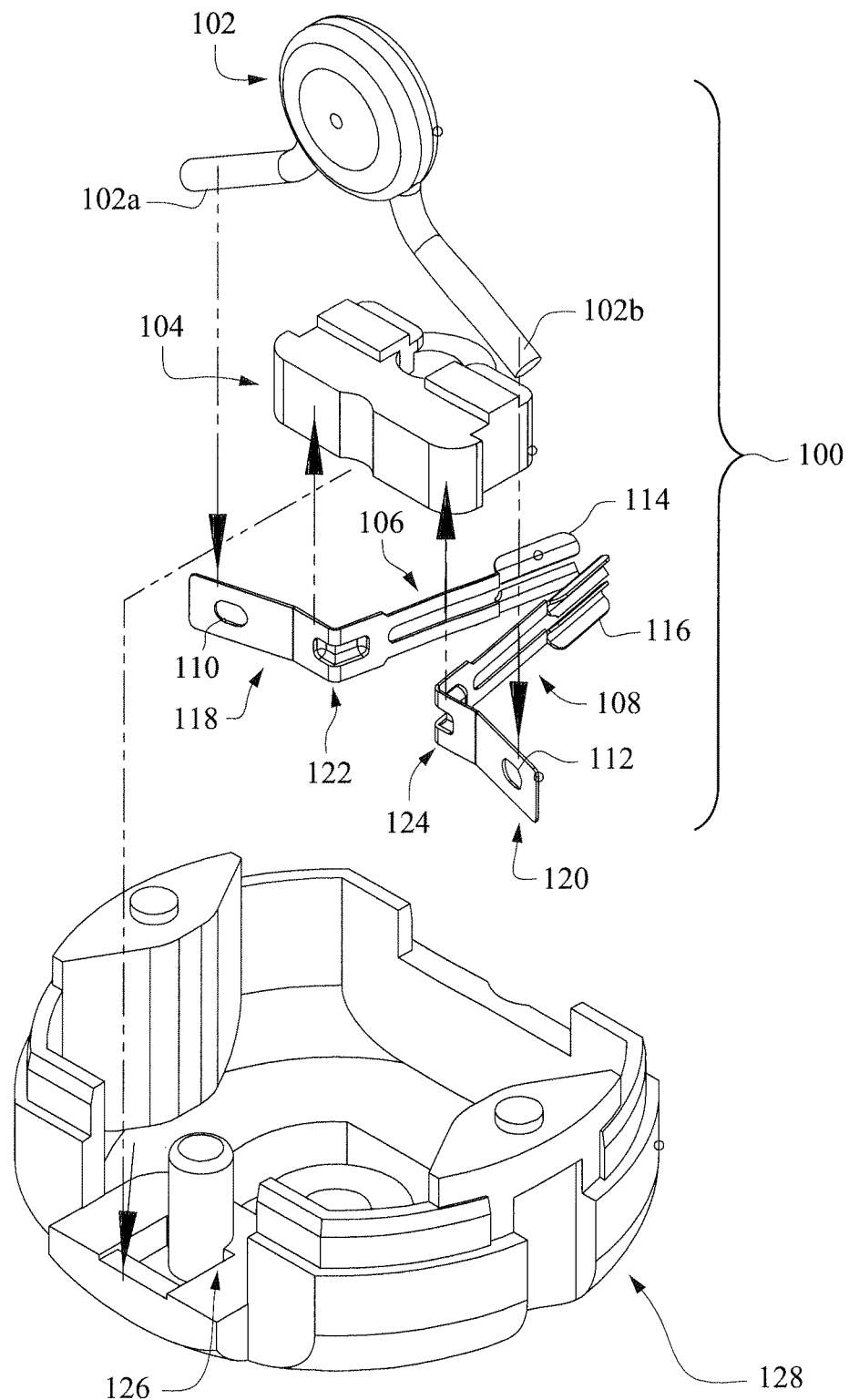
FIG. 1 is an exploded view of a conventional motor cover and brush base assembly including a through-hole type capacitor, a brush base, two brush arms, and a motor cover.
Figure 2:
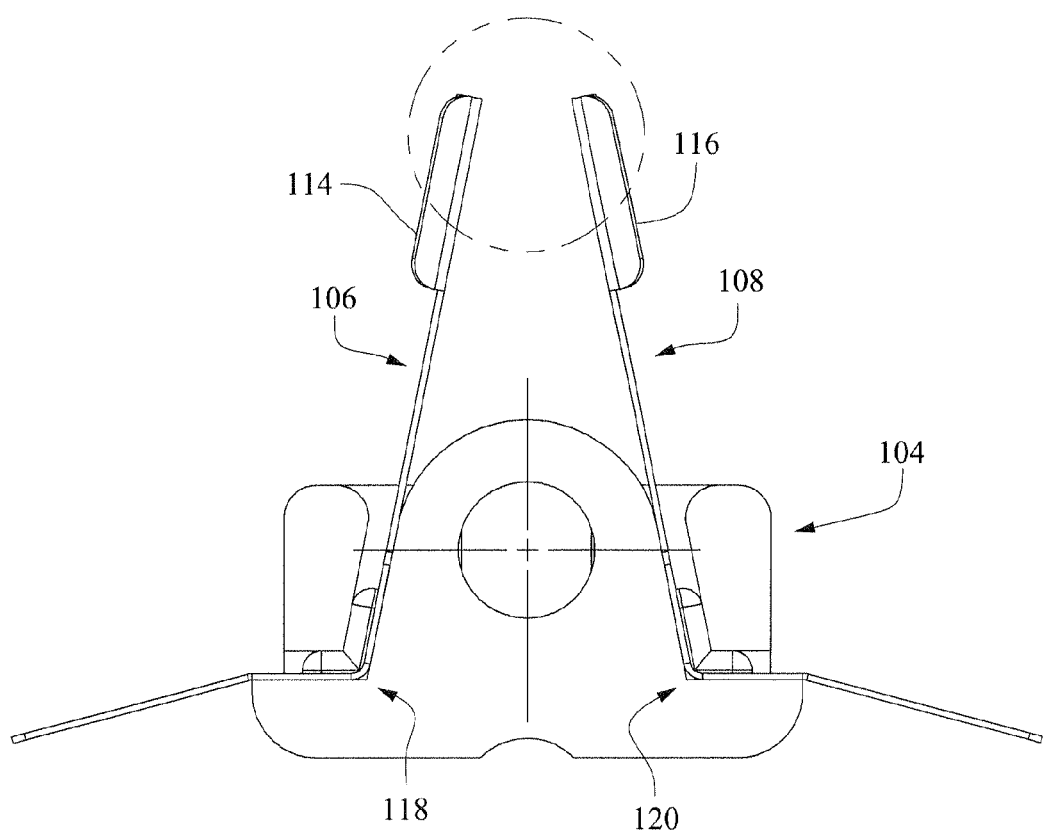
FIG. 2 is a sectional view of a conventional brush base and brush arm assembly including a brush base and two brush arms.
Figure 4:
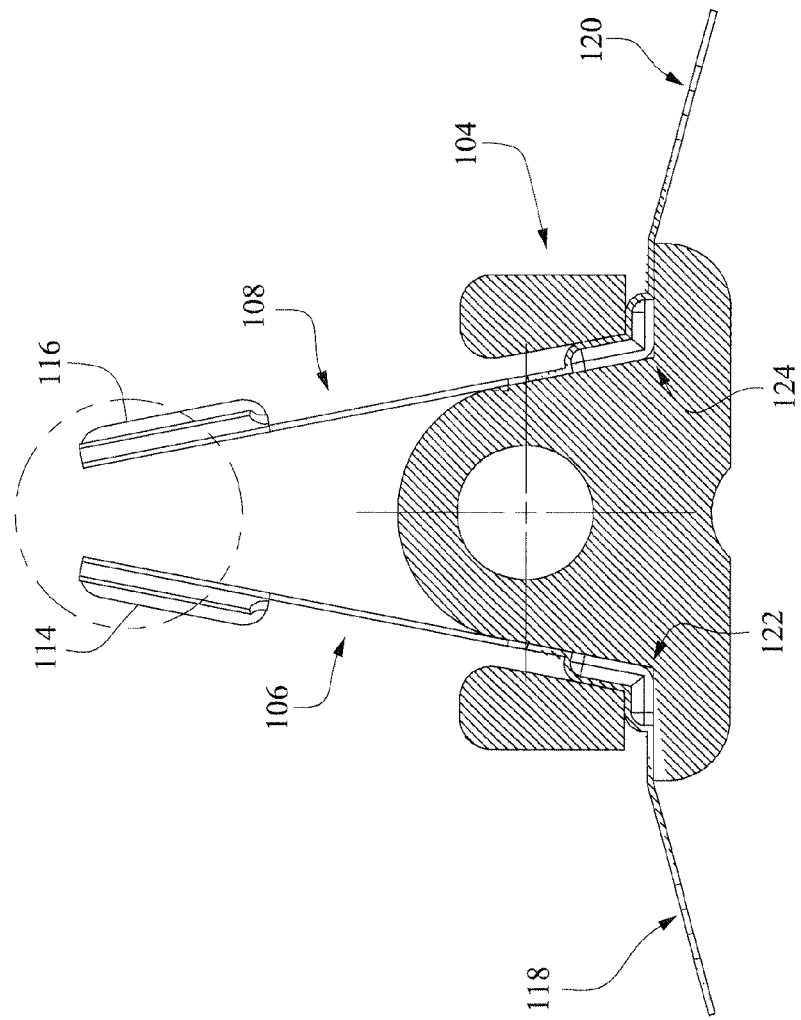
FIG. 4 is a cross-section view of the brush base assembly of FIG. 2.
Figure 3:
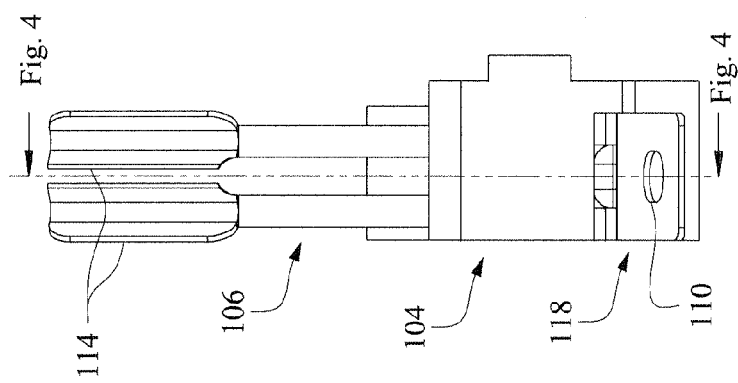
FIG. 3 is a side view of the brush base assembly of FIG. 2.
Figure 5:
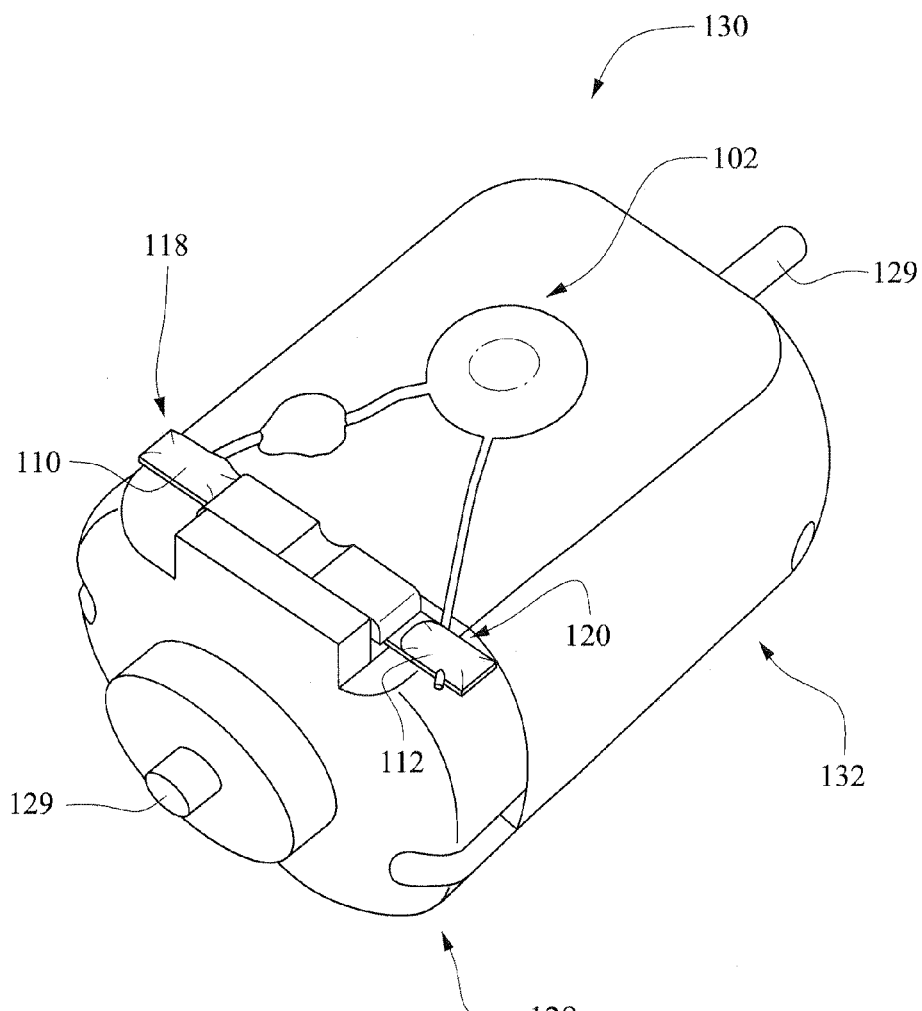
FIG. 5 is a perspective view of a conventional DC electric motor including an exposed capacitor.
Figure 6:
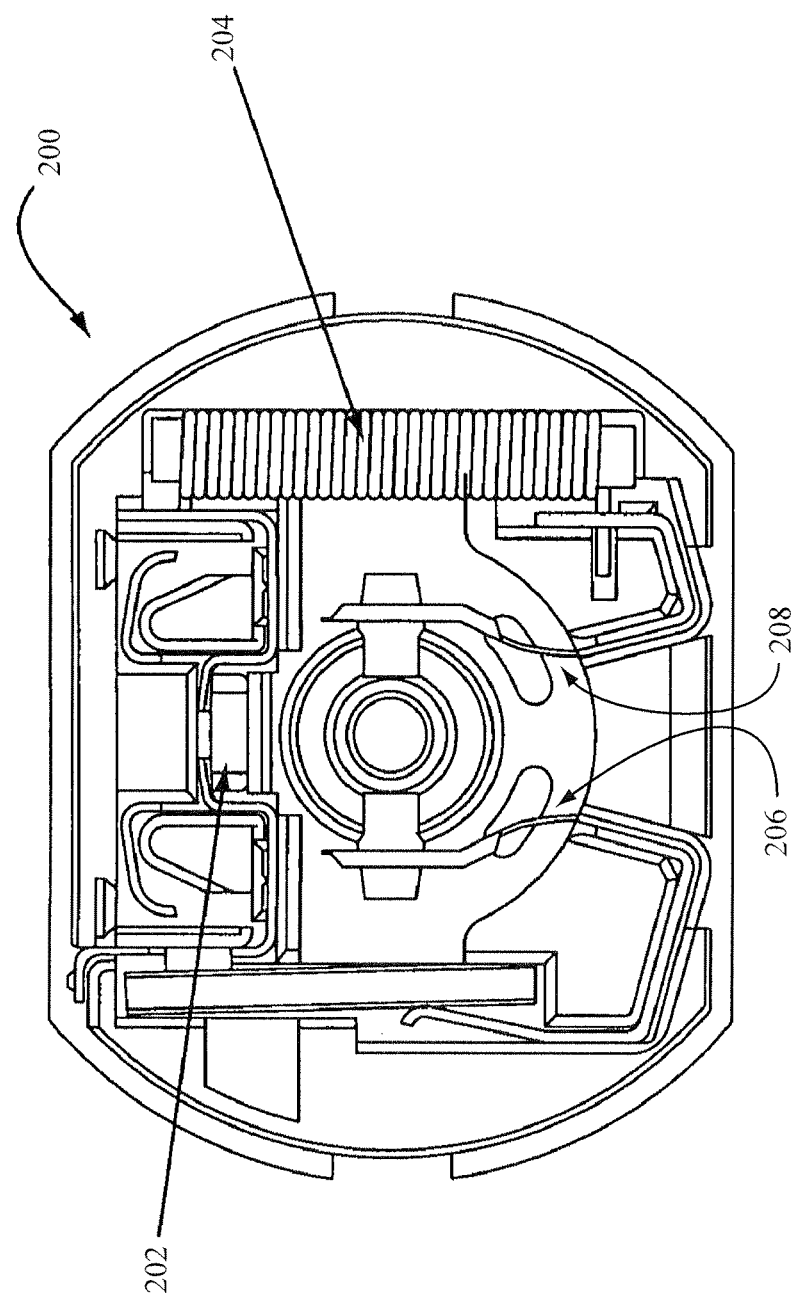
FIG. 6 is a sectional view of a prior art motor cover including a chip capacitor, a coil and two brush arms.
Figure 7:
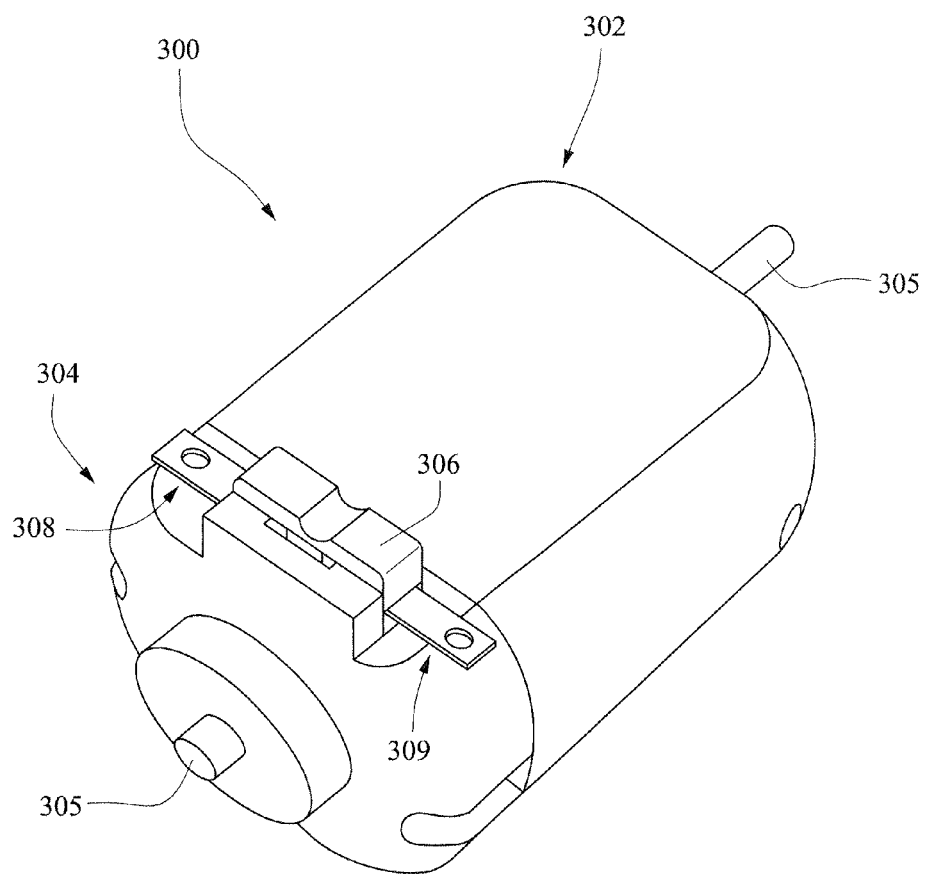
FIG. 7 is a perspective view of an exemplary embodiment of a DC electric motor of the new design and assembly method.

Referring now to the drawings, in which like reference numerals designate similar parts throughout the various views, FIG. 7 shows an exemplary embodiment of a DC electric motor 300 of the new design and assembly method. DC electric motor 300 includes motor housing 302 and motor cover 304, which together, among other things, protect the interior components of the motor. Rotor shaft 305 extends through opposite ends of motor 300. Also shown in FIG. 7 is the external surface of brush base 306 with external electric contacts 308 and 309 (having holes 310 and 312, respectively) which preferably extend outwardly from opposite ends of the brush base along an axis perpendicular to the axis of rotor shaft 305. While the embodiment shown in FIG. 7 has particular application to motorized toys, audio and video equipment, hand tools and other electrical motor-driven devices, vehicles or appliances, the invention is not limited to these applications and can be used in any suitable application.

Figure 8:
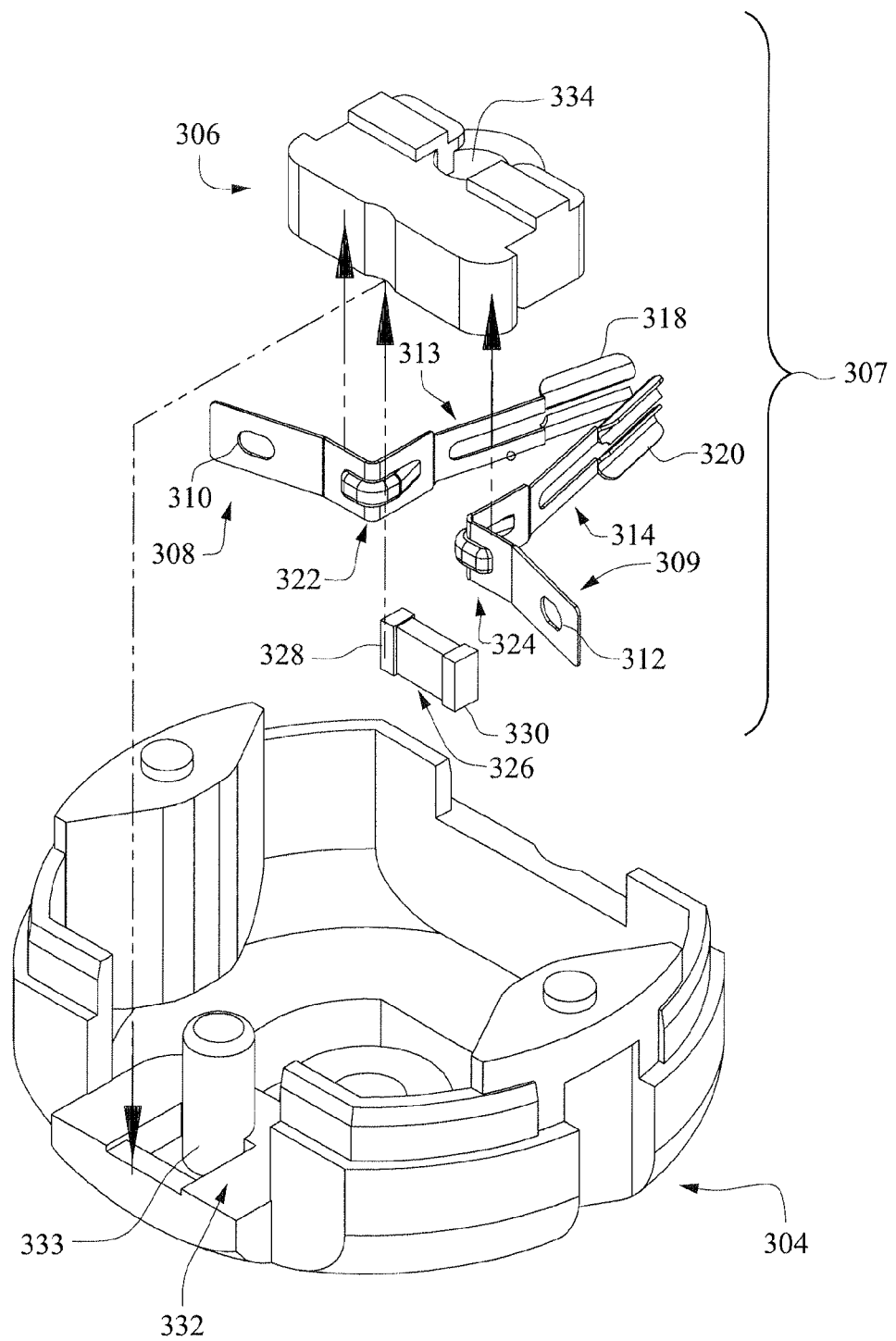
FIG. 8 is an exploded view of an exemplary embodiment of the new design and assembly method including a brush base, brush arms, a ceramic chip capacitor, and a motor cover.

FIG. 8 shows an exploded view of preferred brush base and brush arm assembly 307 of motor 300. Assembly 307 includes chip capacitor 326, brush base 306 and brush arms 313 and 314, said brush arms having at one end brushes 318 and 320, and at the other end external electric contacts 308 and 309, respectively. Chip capacitor 326 may be any capacitor suited for use as a filter for electromagnetic noise in an electric motor input circuit. For example, chip capacitor 326 may be a multilayer surface mount ceramic capacitor constructed by screen printing alternative layers of internal metallic electrodes onto ceramic dielectric materials fired into a concrete monolithic body, then completed by application of metal to the terminal ends of the capacitor which are fired to permanently bond with the individual electrodes. Other capacitor types and/or firing techniques may be used in connection with different exemplary embodiments, as will be appreciated by one of ordinary skill in the art from the description herein. The particular and other characteristics of the chip capacitor are selected or adapted to be suitable for the particular application in which the capacitor is used.

As shown in the exemplary embodiment of FIG. 8, brush arms 313 and 314 are inserted into brush base 306 at elbow sections 322 and 324, respectively, with external contacts 308 and 309 extending outwardly in opposite directions from brush base 306. In the exemplary embodiment, chip capacitor 326 is inserted between brush arms 313 and 314 within a hollow, protective space (not shown) provided in brush base 306. The terminal ends 328 and 330 of chip capacitor 326 are thereby positioned such that they are in surface contact with brush arms 313 and 314 at elbow sections 322 and 324, respectively, within said hollow space provided in brush base 306. Brush arms 313 and 314 are preferably shaped at elbow sections 322 and 324 to bulge inwardly in the direction of chip capacitor 326 located in the hollow space (not shown) provided in brush base 306 in order to support or hold chip capacitor 326 within the hollow space and maintain surface contact with the terminal ends of the chip capacitor, thereby providing a solderless electrical connection between the terminal ends of the chip capacitor and the brush arms. As will be appreciated by one skilled in the art, elbow sections 322 and 324 of brush arms 313 and 314 may be shaped using any number of known methods, for example, by bending, stamping, or forging at least one of the brush arms such that tension is applied to the chip capacitor sufficient to support or hold the chip capacitor in place between brush arms 313 and 314 while maintaining sufficient surface contact with the brush arms to provide a solderless electrical connection between brush arms 313 and 314 and terminal ends 328 and 330 of the capacitor, respectively. Moreover, brush arms 313 and 314 may comprise an additional piece or pieces at one or both elbow sections 322 and 324 adequate to supply sufficient tension to the chip capacitor in order to support or hold the chip capacitor in place between brush arms 313 and 314 while maintaining sufficient surface contact with the brush arms to provide a solderless electrical connection between brush arms 313 and 314 and terminal ends 328 and 330 of the capacitor, respectively.

In the exemplary embodiment shown in FIG. 8, chip capacitor 326 is sandwiched between motor cover 304 and brush base 306 within the hollow space provided in brush base 306. However, various other embodiments may be configured such that brush base 306 is an integral part of motor cover 304 and serves as a brush arm holder having a protective hollow space for accepting and housing chip capacitor 326 and positioning the chip capacitor between brush arms 313 and 314 such that surface contact is maintained between the brush arms 313 and 314 and chip capacitor terminal ends 328 and 330, respectively, such that a solderless electrical connection is maintained between the capacitor and the brush arms.

FIG. 8 also includes motor cover 304 having a brush base attachment section 332 for attaching brush base and brush arm assembly 307 to motor cover 304. Preferably, brush base attachment section 332 is shaped to accept brush base and brush arm assembly 307 and support or hold it fixably in place to facilitate attachment of the motor cover to the motor housing. In an exemplary embodiment, motor cover post 333 is provided in motor cover 304 at brush arm attachment section 332 in order to accept and fixably attach brush base 306 to motor cover 304 by lining up brush base attachment hole 334 with motor cover post 333 and pressing the brush base and the motor cover together, such that post 333 is inserted into hole 334 thereby fixably attaching the brush base and brush arm assembly 307 to motor cover 304 at brush base attachment section 332.

FIG. 9 shows a side view of brush base and brush arm assembly 307 with a line bifurcating brush arm 314. FIG. 10 is a cross-sectional view of assembly 307 showing capacitor 326 located between brush arms 313 and 314 at elbow sections 322 and 324 within the hollow space provided in brush base 306. In the exemplary embodiment, chip capacitor 326 is supported or held in place by brush arms 313 and 314 at elbows 322 and 324 such that terminal ends 328 and 330 of capacitor 326 are in surface contact with the brush arms at elbow sections 322 and 324, respectively.

Figure 11:
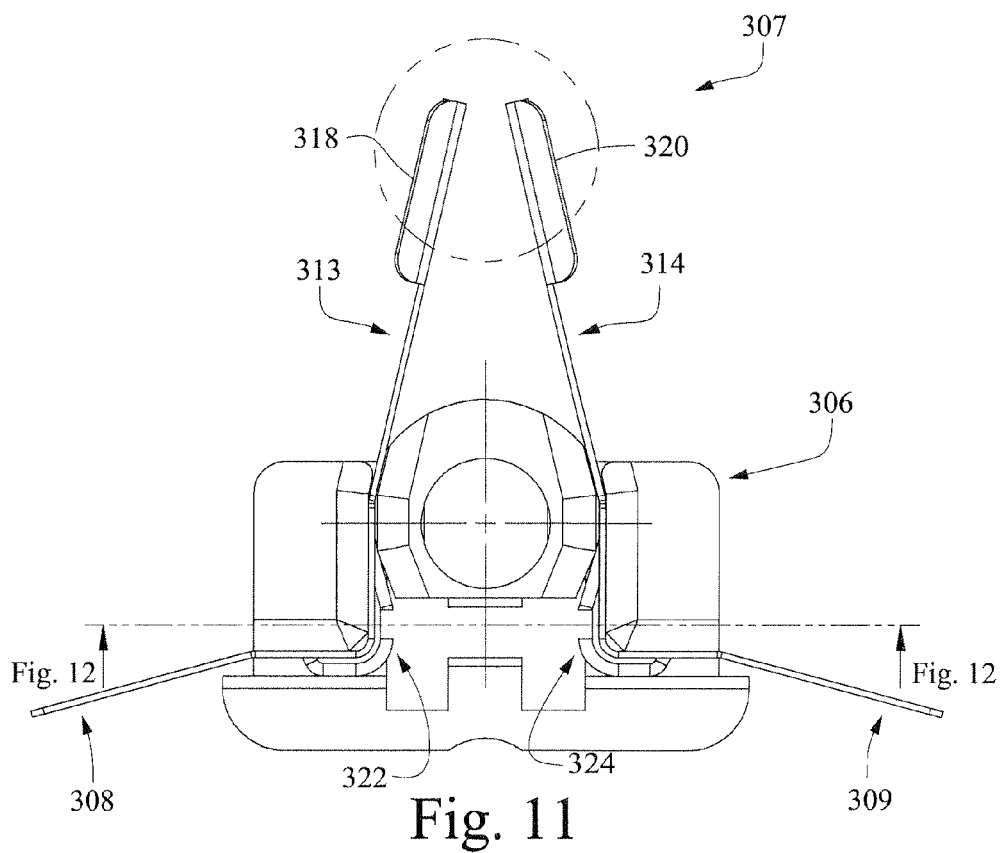
FIG. 11 is a sectional view of an exemplary embodiment of the brush base and brush arm assembly of the new design and assembly method.
Figure 12:
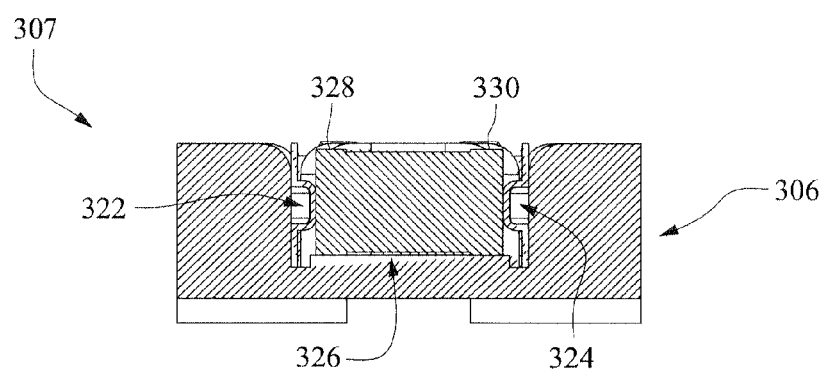
FIG. 12 is a cross section view of the brush base and brush arm assembly of FIG. 11.

FIG. 11 shows brush base and brush arm assembly 307 before insertion of chip capacitor 326 in order to show the M-shaped protective hollow space provided in brush base 306 for supporting or holding the capacitor. As will be appreciated by a person of ordinary skill in the art, the hollow space could be one of a variety of hollow shapes located between brush arms 313 and 314 at elbow sections 322 and 324 suitable to provide a protective housing for chip capacitor 326. FIG. 11 also shows a cross-sectional line through said hollow space provided in brush base 306. FIG. 12 is a cross-section view of FIG. 11 showing the hollow space with chip capacitor 326 inserted between brush arm elbow sections 322 and 324. As shown in FIG. 12, terminal ends 328 and 330 of chip capacitor 326 are in surface contact with the brush arms at elbow sections 322 and 324, respectively, thereby providing a solderless electrical contact between the brush arms and the capacitor. Also shown are exemplary shapes formed in the brush arms at elbow sections 322 and 324 which bulge inward toward the capacitor providing sufficient tension to support or hold the capacitor in place within the hollow space provided by brush base 306 such that a solderless electrical connection is maintained between the terminal ends of the capacitor and the brush arms.

Primary benefits of certain exemplary embodiments of the new design and assembly method include: (i) lower assembly cost, including lower labor costs; (ii) better fitment of motor assembly parts; (iii) fewer quality control problems with motor parts and assemblies; and/or (iii) better protection of the capacitor from physical damage. For example, the elimination of a soldered electrical connection between the capacitor and the brush arms provides several advantages. For example, because the brush arms and the metal legs of a conventional capacitor are typically made of different metals such as, for example, copper in the former and iron in the latter, there may be a significant difference in the two metal's respective melting points (copper: 1,084° C.; iron: 1,536° C.). At too low of a temperature, it is difficult to solder the pieces together at all. At higher temperatures, soldering is facilitated, but the additional heat can lead to deformation of the brush arms and/or brushes, thereby adversely affecting performance of the motor. Furthermore, the solder size and the location of the solder must be constantly monitored and carefully controlled, as too large a solder size or an improperly located solder may, for example, interfere with proper fitment of the motor cover onto the motor housing in the assembly process. On the other hand, a solderless electrical connection between the capacitor and the brush arms such as, for example the one shown in FIG. 8, helps to reduce the likelihood of occurrence of the problems typically associated with a soldered electrical connection. Also, by using a chip capacitor located within the hollow space of the brush base 306, rather than a conventional capacitor with metal legs soldered to the external electrical contacts of the brush arms and located outside the motor cover and motor housing, the capacitor is provided with a protective housing which serves to reduce the risk of physical damage to the capacitor during assembly, installation and/or use.

An exemplary embodiment of the improved assembly method includes, in no particular order, inserting brush arms 313 and 314 at elbow sections 322 and 324 into brush base 306 at opposite ends of the brush base. The method further includes inserting chip capacitor 326 into the hollow space provided in brush base 306 and between brush arms 313 and 314 at elbow sections 322 and 324 such that terminal ends 328 and 330 of the capacitor are in surface contact with elbow sections 322 and 324, respectively, forming brush base and brush arm assembly 307. The method further includes lining up brush base attachment hole 334 with motor cover post 333 and pressing the brush base and the motor cover together, such that post 333 is inserted into hole 334 thereby fixably attaching the brush base and brush arm assembly 307 to motor cover 304 at brush base attachment section 332.

It is to be understood that the invention is not to be limited to the disclosed embodiments, on the contrary, it is intended to cover various modifications and equivalent arrangements included within the spirit and scope of the appended claims.

What is claimed is:

1. A method for assembling a direct current electric motor, the method comprising:
    inserting a first brush arm and a second brush arm into a brush base at opposite ends of a hollow space provided in said brush base;
    inserting a chip capacitor having two substantially flat terminal ends into the hollow space provided in said brush base;
    positioning the capacitor and the brush arms such that one of the substantially flat terminal ends of the capacitor is urged against and in direct surface contact with the first brush arm and the other substantially flat terminal end of the capacitor is urged against and in direct surface contact with the second brush arm, wherein said chip capacitor is arranged to filter electromagnetic noises in the electrical input supplied to the motor.

2. A method according to claim 1, further including shaping at least one of the brush arms to hold the capacitor in said hollow space.

3. A method according to claim 1, further including inserting a surface mount ceramic capacitor in said hollow space.

4. A method according to claim 1, further including making solderless electrical connections between the capacitor and said first and second brush arms.

5. A method according to claim 1, further including inserting the brush base into a motor cover.

\* \* \* \* \*